United States Patent
Kim et al.

(10) Patent No.: US 10,260,655 B2
(45) Date of Patent: Apr. 16, 2019

(54) ANGLE VALVE HAVING FIXED HEATER BLOCK

(71) Applicant: PRESYS.CO., LTD, Suwon-si (KR)

(72) Inventors: Bae-Jin Kim, Suwon-si (KR); Sang Min Kim, Suwon-si (KR)

(73) Assignee: PRESYS.CO., LTD, Suwon (KR)

( * ) Notice: Subject to any disclaimer, the term of this patent is extended or adjusted under 35 U.S.C. 154(b) by 92 days.

(21) Appl. No.: 15/507,944

(22) PCT Filed: Sep. 3, 2015

(86) PCT No.: PCT/KR2015/009274
§ 371 (c)(1),
(2) Date: Mar. 1, 2017

(87) PCT Pub. No.: WO2016/043456
PCT Pub. Date: Mar. 24, 2016

(65) Prior Publication Data
US 2018/0135776 A1  May 17, 2018

(30) Foreign Application Priority Data
Sep. 16, 2014 (KR) .................. 10-2014-0122490

(51) Int. Cl.
| | |
|---|---|
| F16K 49/00 | (2006.01) |
| F16K 51/02 | (2006.01) |
| F16K 1/32 | (2006.01) |
| F16K 31/122 | (2006.01) |
| F16K 41/10 | (2006.01) |
| F16K 1/48 | (2006.01) |

(52) U.S. Cl.
CPC .............. *F16K 49/002* (2013.01); *F16K 1/32* (2013.01); *F16K 1/48* (2013.01); *F16K 31/1221* (2013.01); *F16K 41/10* (2013.01); *F16K 51/02* (2013.01)

(58) Field of Classification Search
CPC ............................. F16K 49/00; F16K 49/002
USPC ....................................................... 137/341
See application file for complete search history.

(56) References Cited

U.S. PATENT DOCUMENTS

| | | | | |
|---|---|---|---|---|
| 5,915,410 | A * | 6/1999 | Zajac ........................ | F16K 1/54 137/341 |
| 6,321,780 | B1 * | 11/2001 | Iwabuchi ................ | F16K 31/04 137/341 |
| 6,708,721 | B2 * | 3/2004 | Fukuda .................. | F16K 49/002 137/338 |
| 6,748,969 | B2 * | 6/2004 | Kanzaka ............... | F16K 49/002 137/338 |
| 6,907,897 | B2 * | 6/2005 | Maula ...................... | F16K 7/14 137/334 |

(Continued)

*Primary Examiner* — Kevin F Murphy
(74) *Attorney, Agent, or Firm* — Patentfile, LLC; Bradley C. Fach (57) ABSTRACT

Provided is an angle valve including a fixed heater block. The angle valve includes a valve casing 100 having a fluid flow hole 101 defined therein and having an inlet 110 through which fluid is introduced and an outlet 120 through which the fluid is discharged, a fixed heater block 200 fixedly installed in the valve casing 100 and having a slide hole 210 defined therein, a driving member 300 detachably coupled to an upper portion of the valve casing 100 to provide a driving force, and a sealing unit 400 connected to the driving member 300 to open and close the inlet 110 according to whether the driving member 300 is driven.

3 Claims, 5 Drawing Sheets

(56) References Cited

U.S. PATENT DOCUMENTS

| | | | |
|---|---|---|---|
| 8,443,830 B2* | 5/2013 | Tanikawa | F16K 41/10 137/341 |
| 8,534,311 B2* | 9/2013 | Ishigaki | F16K 3/3165 137/341 |

* cited by examiner

ANGLE VALVE HAVING FIXED HEATER BLOCK

This Application is a 35 U.S.C. 371 National Stage Entry of International Application No. PCT/KR2015/009274 filed on Sep. 3, 2015, which claims the benefit of Republic of Korea Patent Application No. 10-2014-0122490, filed on Sep. 16, 2014, the entire disclosures of which are incorporated by reference herein.

TECHNICAL FIELD

The present invention relates to an angle valve including a fixed heater block. The angle valve includes: a valve casing 100 having a fluid flow hole 101 defined therein and including an inlet 110 through which fluid is introduced and an outlet 120 through which the fluid is discharged; a fixed heater block 200 fixed in the valve casing 100 and having a slide hole 210 defined therein; a driving member 300 detachably coupled to an upper portion of the valve casing 100 to provide a driving force; and a sealing unit 400 connected to the driving member 300 to open and close the inlet 110 according to whether the driving member 300 is driven.

BACKGROUND ART

In general, since each of a semiconductor and LCD has a high precision degree, high cleanliness and special manufacturing technique are required.

Due to such a reason, a semiconductor device is manufactured in a vacuum state to completely block contact of foreign substances contained in the air.

Accordingly, technique for sealing a vacuum operation area of a semiconductor manufacturing apparatus from the atmosphere also gives significant effects on a quality of a semiconductor product.

In the above-described processing area for manufacturing a semiconductor, an angle valve is installed to transfer fluid moved by a vacuum pump to a chamber or block the fluid.

As the angle valve includes an inlet through which the fluid is introduced and an outlet through which the fluid is discharged, and a sealing unit moves according to whether a cylinder is driven to open and close the inlet, the fluid is transferred into the chamber or blocked.

Meanwhile, as the fluid is discharged by the vacuum pump, process by-products are introduced into the angle valve. Due to this, when the bellows made of stainless steel or metal in the angle valve is exposed, particles are generated due to a chemical reaction.

The particles generated by the above-described chemical reaction are precipitated at a low temperature and stuck on the sealing unit or the like to reduce a lifespan of the angle valve. To prevent the sticking of the particles, a heater radiating heat that is greater than a predetermined temperature is attached in the angle valve to increase an inner temperature of the angle valve, thereby preventing the precipitation phenomenon of the particles.

According to the below patent document 1 of "Vacuum exhaust valve of CVD apparatus (Korean Pat. No. 10-0256768)", in a vacuum exhaust valve of a CVD apparatus in which an operation connecting part of a valve body that is opened and closed by an actuator disposed thereabove is sealed by a bellows in a valve box having a gas inlet or a gas outlet at one side thereof and a gas outlet at a lower side thereof, a sheath heater on an elastically stretchable coil is disposed at an outer circumference side of the operation connecting part of the valve body in the bellows, a lower end thereof is fixed above the valve body, an upper end is fixed to a ceiling surface in the valve box, and then connected to a lead wire outside the valve box, a sheath thermocouple controlling a temperature of the sheath heater is concentrically disposed at an inner circumferential side of the sheath heater with the same level and the same coil winding number, and a rubber heater is attached to an outer surface of the valve box. Accordingly, the valve body and the sheath heater in the bellows may integrally operate to heat the valve body and the bellows while the valve is opened and closed, thereby preventing particles from being generated in the valve box.

However, in the patent document 1 of "Vacuum exhaust valve of CVD apparatus, as the coil shaped sheath heater and sheath thermocouple, which are connected to a piston rod, simultaneously move during a vertical movement of the actuator, the sheath heater and the sheath thermocouple may experience a reciprocal process of contraction and relaxation due to an operation of the actuator that is repeated at least hundreds of times to thousands of times per a day. As a result, the sheath heater and the sheath thermocouple may be displaced and damaged.

Also, due to a structural shape of the coil shaped sheath heater and sheath thermocouple, during relaxation, since a heat generation rate is small in comparison with a volume of the relaxed sheath heater, the heat may not be efficiently transferred into the valve box and the bellows.

DISCLOSURE OF THE INVENTION

Technical Problem

The present invention provides an angle valve including a fixed heater block, in which as the fixed heater block is fixed in a bellows to maintain a fixed state of the fixed heater block although the driving member operates, the angle valve may improve a lifespan and efficiency of the fixed heater block and reduce the number of replacement of a component, and prevent a wire connected to the fixed heater block from being damaged by an operation of a driving member.

The present invention also provides an angle valve including a fixed heater block, in which as a heat transfer block vertically moving by driving of a driving member is connected to the fixed heater block of which an entire body generates heat, thermal conduction and radiation may be performed uniformly in a valve casing and a bellows.

Technical Solution

An embodiment of the inventive concept provides an angle valve 1 having a fixed heater block, the angle valve 1 including: a valve casing 100 having a fluid flow hole 101 defined therein and including an inlet 110 through which fluid is introduced and an outlet 120 through which the fluid is discharged; a fixed heater block 200 fixedly installed in the valve casing 100 and having a slide hole 210 defined therein; a driving member 300 detachably coupled to an upper portion of the valve casing 100 to provide a driving force; and a sealing unit 400 connected to the driving member 300 to open and close the inlet 110 according to whether the driving member 300 is driven.

In an embodiment, the sealing unit 400 may include a heat transfer block 410 having a connection groove 411 into which the fixed heater block 200 is inserted so that heat generated from the fixed heater block 200 is conducted thereto.

In an embodiment, the sealing unit 400 may include: a fixing plate 420 having a fixing portion 421 horizontally extending from an upper portion thereof, a support 422 disposed on a lower portion thereof, and an insertion hole 423 defined in a central portion of the support 422; a bellows 430 coupled to a lower portion of the support 422 to separate a vacuum state provided in the valve casing 100 from the atmospheric state; and a sealing plate 440 having a coupling groove 441 recessed in an inside direction so that the heat transfer block 410 is inserted therein.

In an embodiment, the fixed heater block 200 may further include a holding part 220 extending from an upper outer circumference so that the holding part 220 of the fixed heater block 200 is seated on the support 422 of the fixing plate 420 to dispose the fixed heater block 200 in the bellows 430.

In an embodiment, a heat transfer shaft 450 configured to connect the driving member 300 to a heat transfer block 610 may be provided.

Advantageous Effects

According to the present invention, as the heating fixed heater block is fixed in the bellows to maintain the fixed state of the fixed heater block although the driving member operates, the lifespan and efficiency of the fixed heater block is improved to reduce the number of replacement of the component, and the wire connected to the fixed heater block is prevented from being damaged by the operation of the driving member.

Also, as the heat transfer block vertically moving by the driving of the driving member is connected to the fixed heater block of which an entire body generates heat, the thermal conduction and radiation may be performed uniformly in the valve casing and the bellows.

MODE FOR CARRYING OUT THE INVENTION

Hereinafter, an angle valve 1 including a fixed heater block according to an embodiment of the present invention will be described in detail with reference to the accompanying drawings. It is also noted that like reference numerals denote like elements in appreciating the drawings. Moreover, detailed descriptions related to well-known functions or configurations will be ruled out in order not to unnecessarily obscure subject matters of the present invention.

Figure 2:
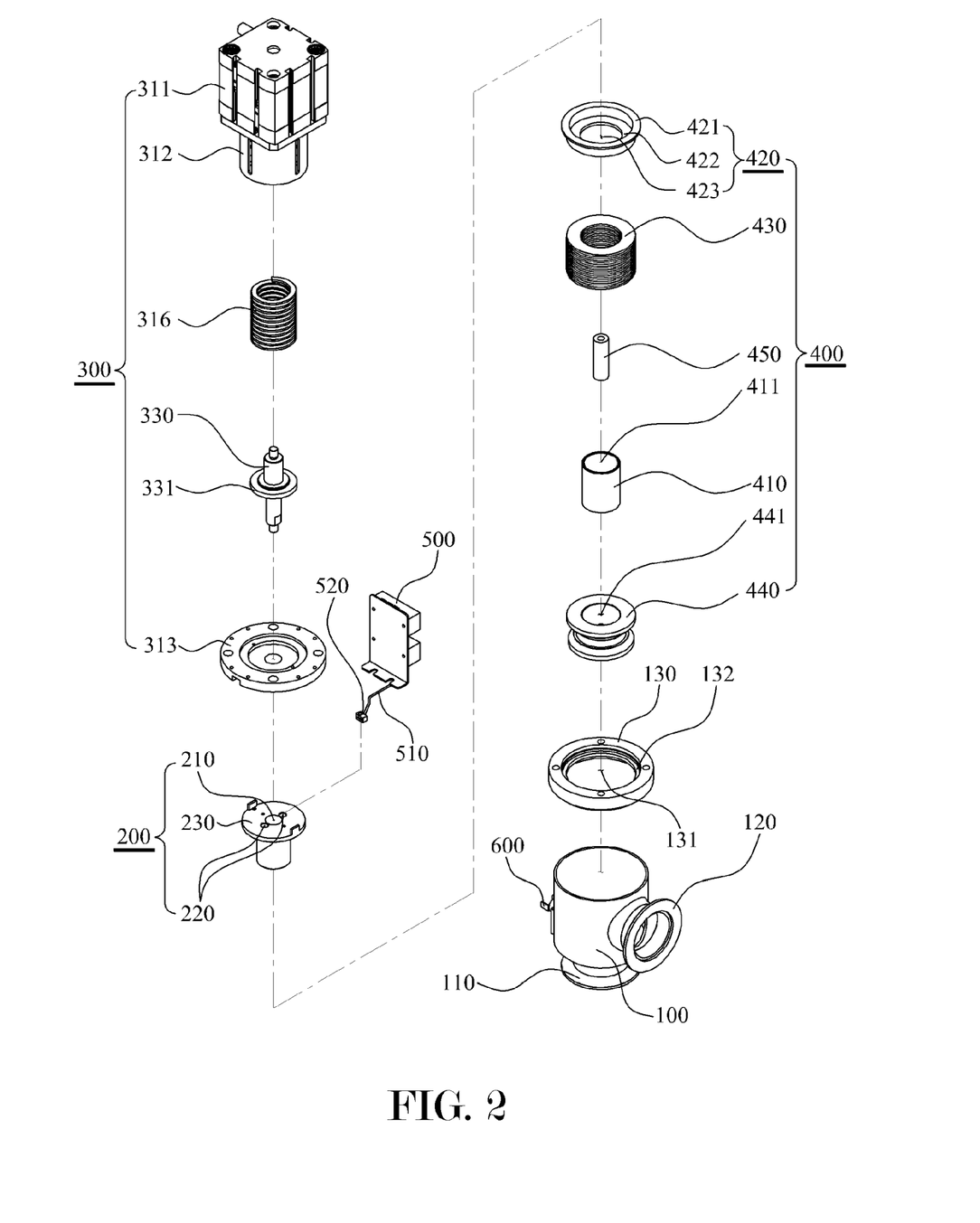
FIG. 2 is an exploded perspective view illustrating a state in which the angle valve including the fixed heater block is exploded according to a preferred embodiment of the present invention.

As illustrated in FIG. 2, an angle valve 1 according to the present invention includes a valve casing 100, a fixed heater block 200, a driving member 300, and a sealing unit 400.

Figure 1:
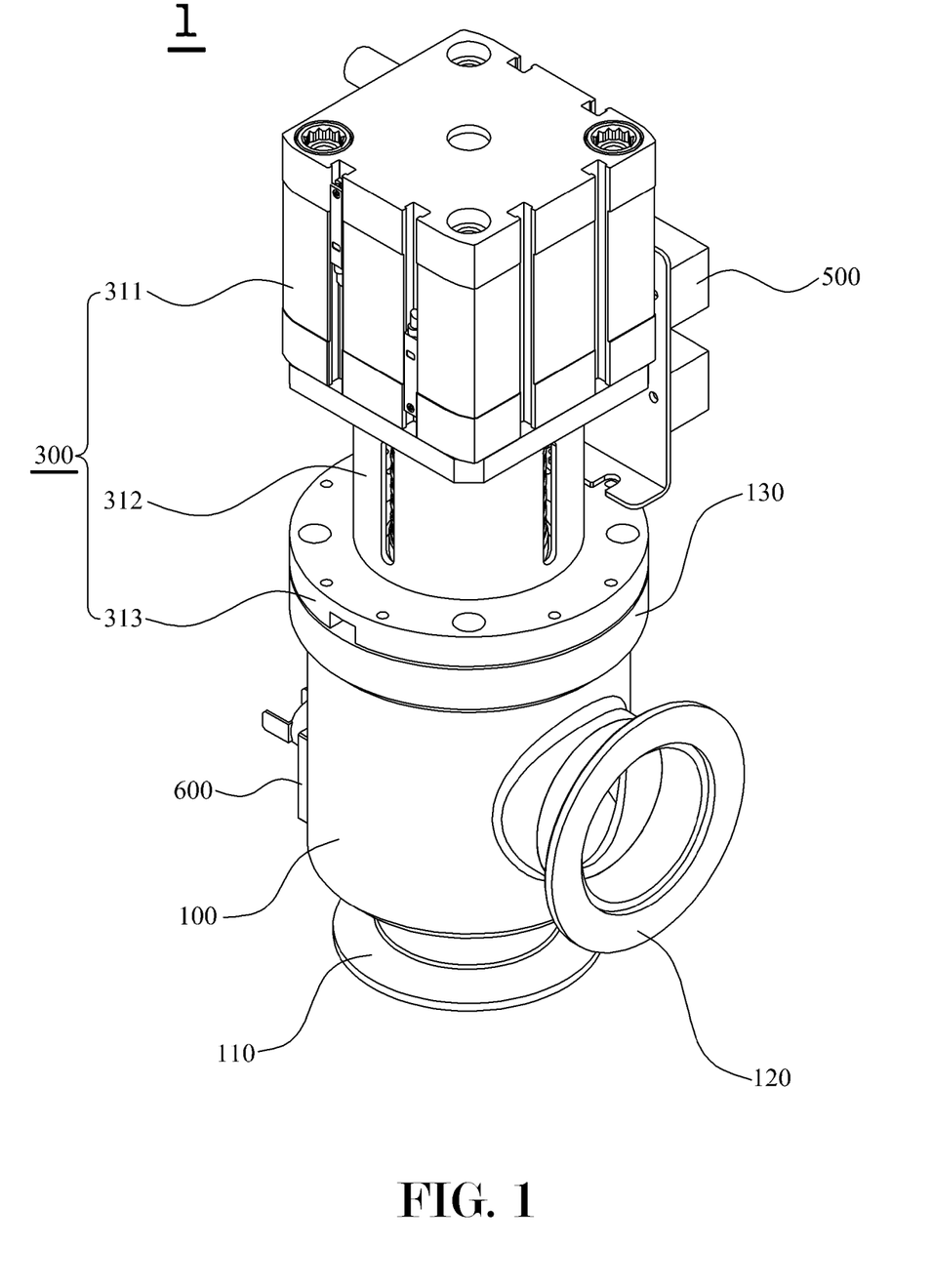
FIG. 1 is a perspective view illustrating an overall appearance of an angle valve including a fixed heater block according to a preferred embodiment of the present invention.

First, the valve casing 100 will be described. As illustrated in FIG. 1 or 2, the valve casing 100 is a component serving as a passage allowing a fluid to move from a vacuum pump (not shown) to a chamber (not shown). The valve casing 100 may include an inlet 110 through which the fluid is introduced and an outlet 120 through which the fluid is discharged.

Figure 3:
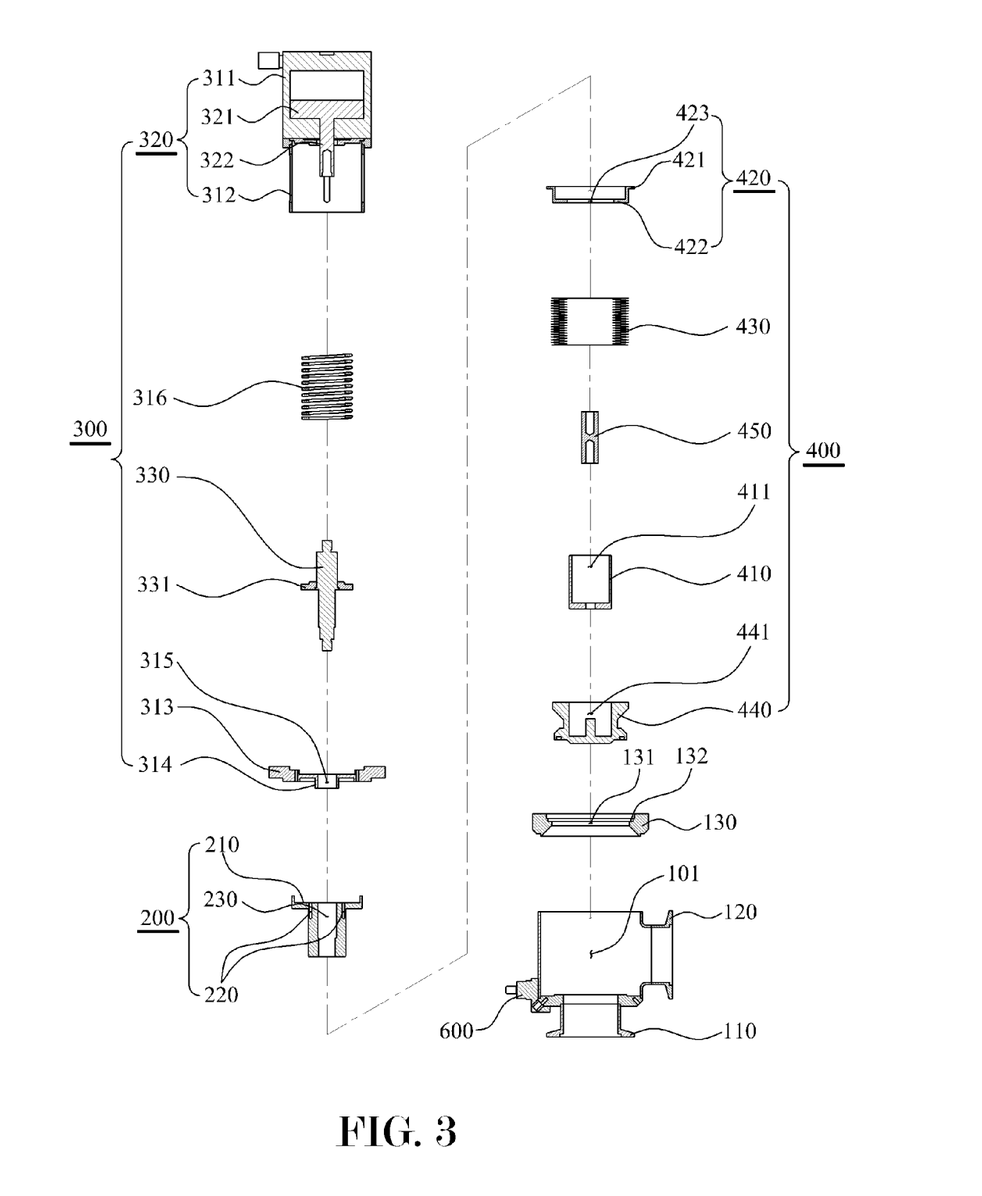
FIG. 3 is an exploded cross-sectional view illustrating a state in which the angle valve including the fixed heater block is exploded according to a preferred embodiment of the present invention.
Figure 4:
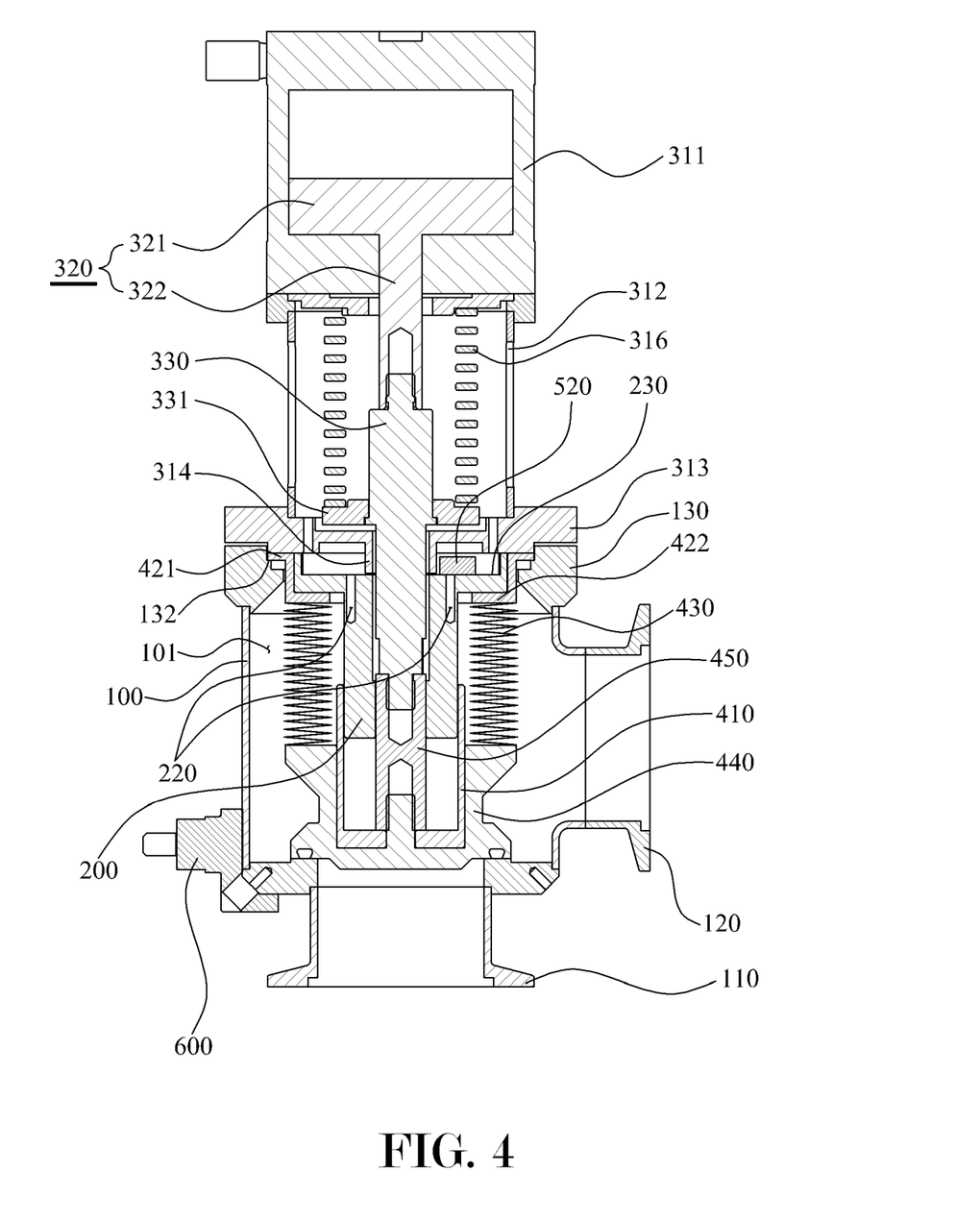
FIG. 4 is a cross-sectional view illustrating a cross-section of the angle valve including the fixed heater block according to a preferred embodiment of the present invention.

Also, as illustrated in FIG. 3 or 4, the valve casing 100 may include an inner space in which a component of the present invention, e.g., the fixed heater block 200 that will be described later is inserted and a fluid flow hole 101 through which the fluid moves is defined.

Meanwhile, as illustrated in FIG. 1 or 2, a first coupling bracket 130 closely connecting the valve casing 100 to the driving member 300 that will be described later may be disposed on an upper portion of the valve casing 100.

Also, according to the present invention, as illustrated in FIG. 2 or 3, a through-hole 131 is defined in a central portion of the first coupling bracket 130, and an L-shaped fixed protrusion 132 is disposed on an upper portion of an inner circumferential surface of the through-hole 131. Thereby, the first coupling bracket 130 may be coupled to a fixing plate 420 that will be described later.

Next, the fixed heater block 200 will be described. As illustrated in FIG. 2 or 4, the fixed heater block 200 is a component fixedly installed in the valve casing 100 and heating an inside of the valve casing 100 to remove particles generated from the inside of the valve casing 100.

Meanwhile, as illustrated in FIG. 2 or 3, as a holding part 220 extending to the outside is provided on an upper portion of an outer circumferential surface of the fixed heater block 200, the holding part 220 of the fixed heater block 200 may be connected to a support 422 of the fixing plate 420 to allow the fixed heater block 200 to be seated on the fixing plate 420.

In this case, the holding part 220 and the support 422 may be fixed by, e.g., screw coupling.

According to the present invention, as the fixed heater block 200 including the holding part 220 has a T shape, the fixed heater block 200 may transfer heat to the support 422 of the fixing plate 420 and a bellows 700 connected to the support 422 and coupled to the fixing plate 420, which will be described later.

Also, as illustrated in FIG. 3 or 4, a slide hole 210, into which a lower portion of a shaft 330 that will be described later is inserted, and installation grooves 230, into which a heater and a thermocouple are respectively inserted, may be defined in the fixed heater block 200.

According to the present invention, as the fixed heater block 200 is fixedly installed in the valve casing 100, since the fixed heater block 200 is fixed although the shaft 330 vertically moves, other components may not be affected during operations (e.g., vertical movement of a piston 320 and elastic movement of an elastic member 316), and a wire 510 and a sensor 520 which are connected to a heating device 500 installed outside the angle valve 1 including the fixed heater block 200 may be prevented from being worn or damaged.

Next, the driving member 300 will be described. As illustrated in FIG. 1 or 2, the driving member 300 is a component coupled to an upper portion of the valve casing 100 to drive the angle valve 1 including the fixed heater block. Although the cylinder type driving device including a piston 320 and a shaft 330 is described as an example, the driving member 300 may further include, e.g., an actuator.

As illustrated in FIG. 1 or 2, the cylinder 310 includes the piston 320 and the shaft 330, which will be described later. Here, the cylinder 310 may be divided into a piston driving portion 311 for driving the piston 320 and a shaft driving portion 312 for driving the shaft 330 connected to the piston 320.

In this case, the piston driving portion 311 may be provided as a sealed space separated from the shaft driving portion 312 for the purpose of smooth operation of the piston 320 and blocking of heat transfer.

Meanwhile, as illustrated in FIG. 2 or 4, a second coupling bracket 313 may be provided on a lower portion of the cylinder 310 so that the second coupling bracket 313 is connected to the first coupling bracket 130 to couple the valve casing 100 to the cylinder 310.

In the present invention, as a cylinder shaped support 314 including an insertion hole 315 through which the shaft 330 is inserted to pass is provided on a central lower portion of the second coupling bracket 313, the lower portion of the support 314 presses the upper portion of the fixed heater block 200 in a state in which the valve casing 100 is coupled to the cylinder 310 to further fix the fixed heater block 200.

Meanwhile, an elastic member 316 guiding movement of the shaft 330 may be provided in the shaft driving portion 312.

As illustrated in FIG. 3 or 4, the piston 400 is a component installed on the piston driving portion 311 to vertically move by a pneumatic pressure. The piston 400 may include a piston plate 321 and a shaft shaped piston rod 322 disposed on a lower portion of the piston plate 321.

In this case, the piston plate 321 may be installed on an inside of the piston driving portion 311, and the piston rod 322 may pass through the piston driving portion 311 and be exposed to an inside of the shaft driving portion 312.

Meanwhile, as illustrated in FIG. 4, as a lower portion of the piston rod 322 is connected to an upper portion of the shaft 330, the shaft 330 may operate together according to whether the piston 320 vertically moves.

As illustrated in FIG. 3 or 4, the shaft 330 is a component having an upper portion connected to the piston rod 322 and a lower portion inserted into the slide hole 210 and connected to a sealing plate 440 that will be described later. The shaft 330 serves to open and close the sealing plate 440 according to whether the piston 320 vertically moves.

Also, as illustrated in FIG. 2 or 4, a catching plate 331 may be provided on an outer circumference of the shaft 330 so that the elastic member 316 is interlocked thereto to provide an elastic force to the shaft 330.

Meanwhile, as a diameter of a lower portion of the shaft 330 inserted into the slide hole 210 is set less than a diameter of the slide hole 210, the shaft 330 may be prevented from being worn and damaged due to friction because the lower outer circumference of the shaft 330 does not contact the inner surface of the slide hole 210, and heat generated from the fixed heater block 200 may not be directly transferred to the shaft 330.

Also, a portion of the shaft 330 disposed in the shaft driving portion 312 may be additionally provided with an insulating material so that the heat generated by the fixed heater block 200 is not transferred into the cylinder 310.

Next, the sealing unit 400 will be described. As illustrated in FIG. 3 or 4, the sealing unit 400 is a component coupled to the lower portion of the shaft 330 to open and close the inlet 110 by the vertical movement of the piston 320. The sealing unit 400 includes a heat transfer block 410, a fixing plate 420, a bellows 430, a sealing plate 440, and a heat transfer shaft 450.

As illustrated in FIG. 2 or 4, the heat transfer block 410 is a component surrounding a central portion and a lower outer circumference of the fixed heater block 200 so that heat radiated from the fixed heater block 200 is conducted thereto. In this case, a connection groove 411 may be defined in a central portion thereof so that the fixed heater block 200 is inserted.

In this case, as illustrated in FIG. 5A or 5B, the heat transfer block 410 may vertically slide while surrounding the central portion and the lower circumference of the fixed heater block 200 according to whether the piston 320 vertically moves.

As the fixing plate 420 is seated and fixed to the fixed protrusion 132, the fixing plate 420 serves to allow an upper portion of the fixed heater block 200 to be seated on the support 142 and allow the fixed heater block 200 to be fixed to an inside of the bellows 430.

As illustrated in FIG. 2 or 3, the fixing plate 420 has a cylindrical shape including an inner space and includes a fixing part 421 provided on an upper portion thereof for connection with the fixed protrusion 132, a support 422 provided on a lower portion thereof, and an insertion hole 423 defined in a central portion of the support 422.

Here, as illustrated in FIG. 3, a stepped portion may be provided between the fixing portion 421 and the support 422.

When the holding part 220 of the fixed heater block 200 is connected to an upper portion of the support 422, and the second coupling bracket 313 connecting the valve casing 100 to the driving member 300 and fixing the fixed heater block 200 is coupled to the first coupling bracket 130, a space is defined between the holding part 220 and the second coupling bracket 313 to prevent the heat radiated from the fixed heater block 200 from being conducted to the driving member 300 due to the space, thereby improving product reliability of the driving member 300.

In addition, a sensor 520 connected to a heating device 500 that will be described later may be installed in the space.

The bellows 430 is characterized to separate a vacuum state provided in the valve casing 100 from the atmospheric state. Desirably, the bellows 430 may have an upper portion fixed to the fixing plate 420 and a lower portion fixed to a sealing plate 440 that will be described later.

Figure 5:
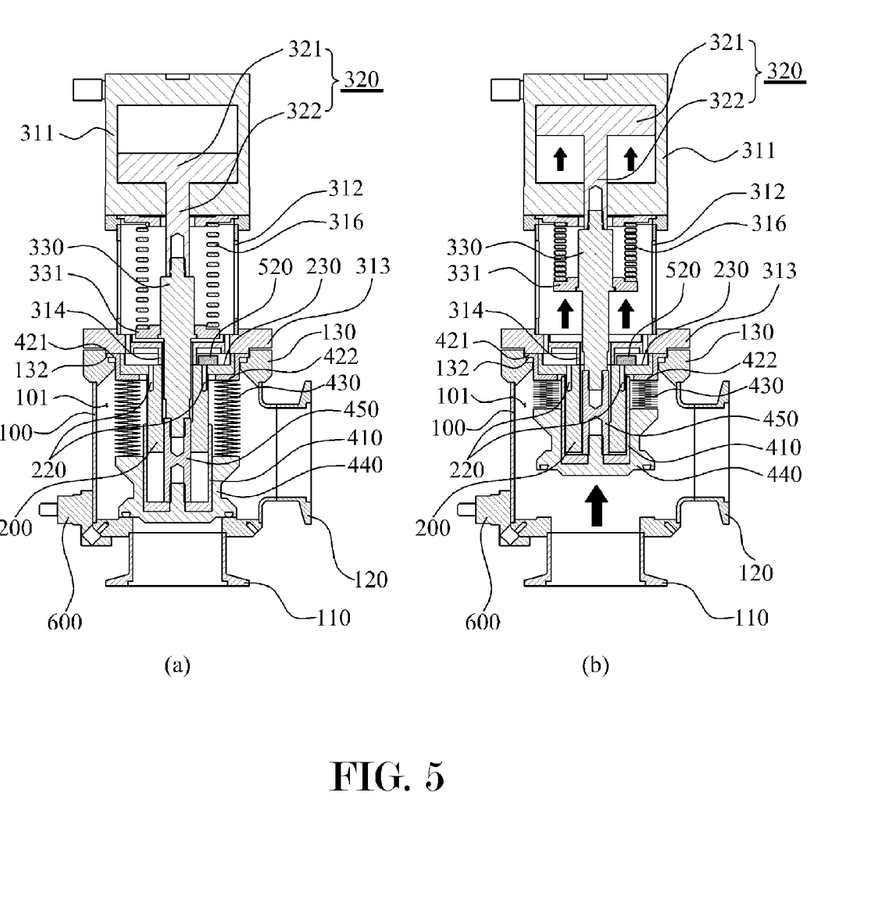
FIG. 5 is a view illustrating a state in which the angle valve including the fixed heater block operates according to a preferred embodiment of the present invention.

As illustrated in FIG. 4 or 5, the sealing plate 440 is a component configured to open and close the inlet 110. The sealing plate may have a coupling groove 441 for connection with the heat transfer block 410.

As illustrated in FIG. 4, the heat transfer shaft 450 may be inserted into the slide hole 210 to allow the shaft 330 and the heat transfer block 410 to be connected to each other.

Meanwhile, a temperature adjusting sensor 600 for detecting a temperature of the valve casing 100 may be installed on the angle valve 1 including the fixed heater block.

Since a principle of constituting and operating the temperature adjusting sensor 600 is well known to those skilled in the art, detailed description regarding this will be omitted.

As described above, as the present invention has a structure in which the valve casing 100 in which the fixed heater block 200 is installed and the driving member 300 are separately constituted to be coupled to and separated from each other, the components provided in the valve casing 100 and the driving member 300 may be efficiently and conveniently replaced and inspected.

Hereinafter, an operation state of the angle valve 1 including the fixed heater block will be described with reference to FIG. 5.

First, FIG. 5 is a view illustrating a state in which as compressed air in the piston driving portion 311 is discharged, the piston 320, the shaft 330, and the sealing plate 440 descend, and the inlet 110 is closed due to the descending of the sealing plate 440.

Thereafter, as illustrated in FIG. 5B, when the compressed air is introduced into the piston driving portion 311, the piston 320 ascends, and the shaft 330 and the sealing plate 440 also ascend to open the closed inlet 110 due to the ascending of the sealing plate 440.

As described above, since the fixed heater block 200 disposed in the bellows 430 is fixed in the valve casing 100 although the piston 320, the shaft 330, and the sealing plate 440 are linked to perform a reciprocal movement, the wire 510 and the sensor 520, which are connected to the heating device 500 installed to the outside of the fixed heater block 200, and the angle valve 1 including the fixed heater block 200 may be prevented from being worn or damaged by the movement thereof, and the fixed heater block 200 may stably radiate heat to increase an inner temperature of the valve casing 100, thereby effectively removing particles generated in the valve casing 100.

Optimum embodiments are disclosed in the drawings and the specification. While specific terms were used, they were not used to limit the meaning or the scope of the present invention described in claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying claims.

The invention claimed is:

1. An angle valve (1) having a fixed heater block, the angle valve (1) comprising:

a valve casing (100) having a fluid flow hole (101) defined therein and comprising an inlet (110) through which fluid is introduced and an outlet (120) through which the fluid is discharged;

a fixed heater block (200) fixedly installed in the valve casing (100) and having a slide hole (210) defined therein;

a driving member (300) detachably coupled to an upper portion of the valve casing (100) to provide a driving force;

a sealing unit (400) connected to the driving member (300) to open and close the inlet (110) according to whether the driving member (300) is driven wherein the sealing unit (400) comprises a heat transfer block (410) having a connection groove (411) into which the fixed heater block (200) is inserted so that heat generated from the fixed heater block (200) is conducted thereto; and wherein the sealing (400) comprises: a fixing plate (420) having a fixing portion (421) horizontally extending from an upper portion thereof, a support (422) disposed on a lower portion thereof, and an insertion hole (423) defined in a central portion of the support (422); a bellows (430) coupled to a lower portion of the support (422) to separate a vacuum state provided in the valve casing (100) from an atmospheric state; and a sealing plate (440) having a coupling groove (441) recessed in an inside direction so that the heat transfer block (410) is inserted therein.

2. The angle valve (1) of claim 1, wherein the fixed heater block (200) further comprises a holding part (220) extending from an upper outer circumference so that the holding part (220) of the fixed heater block (200) is seated on the support (422) of the fixing plate (420) to dispose the fixed heater block (200) in the bellows (430).

3. The angle valve (1) of claim 1, wherein a heat transfer shaft (450) configured to connect the driving member (300) to the transfer block (410) is provided.

\* \* \* \* \*